United States Patent
Howarth et al.

(10) Patent No.: US 8,533,309 B1
(45) Date of Patent: Sep. 10, 2013

(54) SYSTEMS AND METHODS FOR DISTRIBUTED NODE DETECTION AND MANAGEMENT

(75) Inventors: Mark E. Howarth, South Jordan, UT (US); Peter E. Johnson, Lehi, UT (US); Phillip E. Clay, Lindon, UT (US)

(73) Assignee: Crimson Corporation, Dover, DE (US)

( * ) Notice: Subject to any disclaimer, the term of this patent is extended or adjusted under 35 U.S.C. 154(b) by 965 days.

(21) Appl. No.: 11/257,246

(22) Filed: Oct. 24, 2005

(51) Int. Cl.
*G06F 15/173* (2006.01)

(52) U.S. Cl.
USPC ........................................ 709/223

(58) Field of Classification Search
USPC ................................. 709/224, 223
See application file for complete search history.

(56) References Cited

U.S. PATENT DOCUMENTS

| | | | | |
|---|---|---|---|---|
| 5,185,860 | A * | 2/1993 | Wu ................................ | 709/224 |
| 5,963,944 | A * | 10/1999 | Adams .................................... | 1/1 |
| 6,078,955 | A * | 6/2000 | Konno et al. ................. | 709/224 |
| 6,269,099 | B1 | 7/2001 | Borella et al. | |
| 6,496,859 | B2 | 12/2002 | Roy et al. | |
| 6,549,932 | B1 * | 4/2003 | McNally et al. ............... | 709/202 |
| 6,601,175 | B1 * | 7/2003 | Arnold et al. ..................... | 726/7 |
| 6,611,863 | B1 | 8/2003 | Banginwar | |
| 6,859,827 | B2 | 2/2005 | Banginwar | |
| 2002/0013807 | A1 * | 1/2002 | Richard ......................... | 709/202 |
| 2002/0124090 | A1 * | 9/2002 | Poier et al. ..................... | 709/228 |
| 2002/0147974 | A1 * | 10/2002 | Wookey ......................... | 717/176 |
| 2003/0009540 | A1 * | 1/2003 | Benfield et al. ............... | 709/220 |
| 2004/0019889 | A1 * | 1/2004 | Melchione et al. ............ | 717/177 |
| 2005/0289538 | A1 * | 12/2005 | Black-Ziegelbein et al. . | 717/177 |
| 2006/0248522 | A1 * | 11/2006 | Lakshminarayanan et al. ............................ | 717/174 |

\* cited by examiner

*Primary Examiner* — Liangche A Wang
*Assistant Examiner* — Sherman Lin
(74) *Attorney, Agent, or Firm* — Austin Rapp & Hardman

(57) ABSTRACT

A discovery agent is running on a node within the network group. The network group is shielded from an administrative system by a communication limiting device. The communication limiting device prevents the administrative system from detecting nodes within the network group. The communication limiting device, however, does not prevent the node running the discovery agent from identifying other nodes within the network group. The discovery agent detects one or more nodes within the network group and transmits data identifying these nodes to the administrative system. Accordingly, the administrative system may identify and manage the newly detected nodes using a management agent installed on the nodes.

17 Claims, 8 Drawing Sheets

SYSTEMS AND METHODS FOR DISTRIBUTED NODE DETECTION AND MANAGEMENT

TECHNICAL FIELD

The present invention relates generally to computers and computer-related technology. More specifically, the present invention relates to systems and methods for detecting and managing nodes hidden from a remote administrative system by a communication limiting device.

BACKGROUND

Computer technologies continue to advance at a rapid pace. Indeed, computers are used in almost all aspects of business, industry, and academic endeavors. Improvements in computer technologies have been a force for bringing about great increases in business and industrial productivity. More and more homes are using computers as well.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Computer networks have become increasingly important in today's society. Virtually every office environment uses a computer network to share resources, such as files, printers, or scanners. Unfortunately, managing the computer systems, or nodes, within these networks, particularly when the networks include hundreds or thousands of nodes, can be extraordinarily expensive and time-consuming. Further, successful management of these nodes often requires highly specialized knowledge and expertise. Software constantly needs to be updated, for example, to fend off the ever-changing array of viruses and spam (unwanted e-mail messages). In addition, it is often difficult to insure that all the software on a particular node is properly licensed, particularly when this task must be performed for hundreds of nodes. Further, computer users occasionally experience problems and difficulties with their computer systems. These problems need to be addressed rapidly to maintain high levels of productivity.

As a result of the burden and expense of managing a network group, software systems have been developed to enable remote management of the nodes. These software systems can perform numerous tasks, such as remote installation of software patches, creation of hardware and software inventories, and management of software licenses. Unfortunately, remote administration systems, which are used to implement these management systems, are frequently prevented from detecting all the nodes within a managed network group by a communication limiting device, such as a firewall.

The full benefits of a node management system thus cannot be achieved because system administrators simply may not be aware of unmanaged nodes. Furthermore, system administrators may be required to manually manage a node until identifying information for the node is transmitted to the remote node management system. Further, these unmanaged nodes may introduce viruses into a network system or can create other security vulnerabilities that place other nodes or the network at risk.

In view of the foregoing, benefits may be realized by improved systems and methods for distributed detection and management of nodes within a network group. Some exemplary systems and methods for distributed detection and management of nodes are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
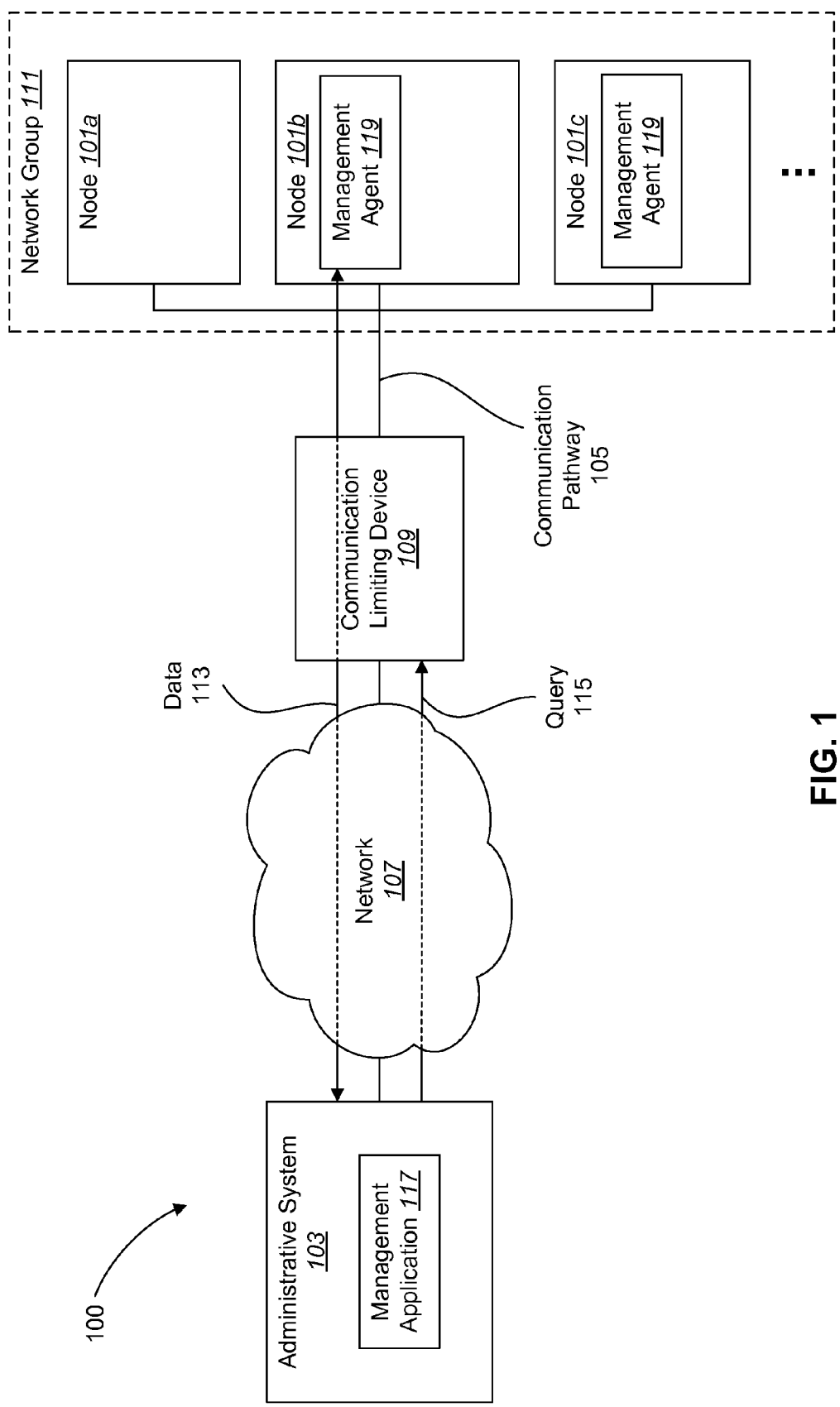
FIG. 1 is a block diagram illustrating a network in which an embodiment of a system for detecting and managing nodes within a network group may be implemented.

A method of detecting and managing nodes within a network group is disclosed. An administrative computer system, a network group, and a communication pathway for electronic communication between the administrative computer system and the network group are provided. A communication limiting device in the communication pathway prevents the administrative computer system from detecting a first node within the network group. A second node is managed within the network group using a management agent to enable the administrative system to communicate with and manage the second node through the communication limiting device. From the second node within the network group, the first node is detected within the network group. Identifying data is obtained to identify the first node. The identifying data is transferred to the administrative computer system.

In one embodiment, an installable management agent is transferred to the first node. A management agent may be installed on the first node. Transferring the installable management agent to the first node may include transferring the installable management agent from the second node to the first node. In certain embodiments at least one of the first and second nodes are end-user nodes. The management agent may be run on the first node to enable the administrative system to communicate with and manage the first node.

In a further embodiment, a list of nodes may be compiled within the network group that are managed by the administrative computer system. It may then be determined whether the first node is included in the list of nodes based on the identifying data.

In a particular embodiment, transferring the installable management agent to the first node comprises transferring the installable management agent from the administrative system to the first node. Credential data may be transferred to the administrative system to enable the administrative system to communicate with the first node.

A system for detecting and managing nodes within a network group is also disclosed. A first node and a second node are within a network group and are in electronic communication with each other. An administrative computer system is provided with a communication pathway for electronic communication between the network group and the administrative computer system. A communication limiting device is in the communication pathway that prevents the administrative computer system from detecting the first node within the network group. The second node and administrative system include a computer-readable medium comprising instructions for implementing a method of detecting and managing nodes within the network group. A second node is managed within the network group using a management agent to enable the administrative system to communicate with and manage the second node through the communication limiting device. From the second node within the network group, the first node is detected within the network group. Identifying data is obtained to identify the first node. The identifying data is transferred to the administrative computer system.

A computer-readable medium comprising executable instructions for implementing a method for detecting and managing nodes within a network group is also disclosed. An administrative computer system, a network group, and a communication pathway for electronic communication between the administrative computer system and the network group are provided. A communication limiting device in the communication pathway prevents the administrative computer system from detecting a first node within the network group. A second node is managed within the network group using a management agent to enable the administrative system to communicate with and manage the second node through the communication limiting device. From the second node within the network group, the first node is detected within the network group. Identifying data is obtained to identify the first node. The identifying data is transferred to the administrative computer system.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating one embodiment of a network 100 in which a system for identifying and managing a previously undetected node 101*a* may be implemented. The system of FIG. 1 includes an administrative computer system 103, an electronic communication pathway 105 that may include one or more networks 107, a communication limiting device 109, and a network group 111. The administrative system 103 and network group 111 are in electronic communication via the electronic communication pathway 105. Accordingly, data 113 on the administrative system 103 may be transferred between connected computer systems 101, or nodes 101, within the network group 111 through the communication pathway 105. The data 113 is not limited to a particular type of information and can include, for example, updates to software packages, a complete computer program, graphics, an operating system or portions thereof, or any information that may be transmitted through a computer network 100.

The administrative system 103 is a computer system from which data 113 may be retrieved or downloaded and may be embodied in a wide variety of different configurations. The administrative system 103 is not limited to a computer system using a specific type of hardware or operating system. For example, the administrative system 103 may use a WINDOWS® SERVER 2003 operating system or a WINDOWS® XP operating system, both from Microsoft Corporation of Redmond, Wash. Alternatively, by way of example, the administrative system 103 could also use UNIX, Linux or other operating systems.

The communication pathway 105 depicted in FIG. 1 may be embodied in a wide variety of configurations and may include portions of one or more networks 107. The communication pathway 105 is not limited to a single data pathway but may include numerous data pathways between two points. The communication pathway 105 may include, for example, portions of a local area network (LAN), storage area networks (SANs), metropolitan area networks (MANs), wide area networks (WANs), satellite networks, other types of wireless networks, and combinations thereof (e.g., the Internet). A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

The depicted network group 111 may also include a network embodied in a wide variety of configurations and protocols, including those enumerated above and, for example, a local area network (LAN), and a subnet or a group of subnets within a larger network. The network group 111 includes two or more nodes 101. The nodes 101 are interconnected and in electronic communication with each other via, for example, a series of routers and/or switches.

The network group 111 illustrated in FIG. 1 includes a first, second, and a third node 101*a-c*. While only three nodes 101 are shown in the network group 111 of FIG. 1, network groups 111 of different sizes may be used with the systems and methods disclosed herein. For example, a network group 111 may include only two nodes 101 or hundreds of nodes 101.

In certain embodiments, the nodes 101 may be categorized into different hierarchical levels. For example, an administrative node 101 has administrative rights to manage other nodes 101 within the network group 111. While an end-user node 101 only has rights to administer the node 101 itself, not other nodes 101 within the network group 111. Furthermore, an end-user node 101, in one embodiment, may have only limited rights to alter settings on the node 101 itself in accordance with protocols and limitations established by an administrative node 101.

The communication limiting device 109 limits external communications with the network group 111 via the communication pathway 105 and may be embodied in a wide variety of configurations. The communication limiting device 109 may comprise hardware, software, or a combination of hardware and software. The communication limiting device 109, in one embodiment, is a firewall. The communication limiting device 109 can include software or hardware that comprises a portion of a stand-alone machine, server, or router. The limiting device 109 could be as simple as a single router that filters undesirable communications or could include a combination of routers and servers, each performing some type of filtering. Communication limiting devices 109 may use a variety of different techniques, such as packet filtering and network address translation (NAT) to block unwanted communications.

The communication limiting device 109 limits communications transmitted from the administrative system 103 to the network group 111. For example, in the network group 111 depicted in FIG. 1, the administrative system 103 transmits a query 115 to identify nodes 101 within the network group 111. This query 115 is blocked by the communication limiting device 109, preventing the administrative system 103 from identifying all nodes 101 within the network group 111. As illustrated, the communication limiting device 109 has prevented, or blocked, the administrative system 103 from detecting the presence of a first node 101*a* in the network group 111. Accordingly, the administrative system 103 is unaware of the first node 101*a* and thus cannot manage this node 101*a*.

In one embodiment, the administrative system 103 includes one or more software programs that may be referred to as a "management application" 117. The management application 117 is used to manage nodes 101 within the network group 111. Each node 101 managed by the administrative system 103 is running one or more software programs that may be referred to as a "management agent" 119. The management agents 119 enable the administrative system 103, through the management application 117, to communicate with and manage nodes 101 running the management agent 119. Data 113 may be transferred between the management agent 119 of a node 101 and the management application 117 of the administrative system 103 to enable management of a particular node 101. This data 113 may be referred to as "management data" 113. Management data 113 may be transferred both to and from a managed node 101*b-c*, and thus does not refer merely to data 113 transmitted from the administrative system 103 to a managed node 101*b-c*.

The management agent 119 provides significant advantages in managing nodes 101 within the network group 111. For example, the management agent 119 can facilitate and/or automate remote installation of software (including software packages and updates) on managed nodes 101*b-c* and can even facilitate or automate migration of a managed node 101*b-c* to a new operating system. The management agent 119 may determine the hardware and software configuration of a managed node 101*b-c* and can optionally transmit this data 113 to the administrative system 103. In addition, the management agent 119 may determine what software licenses are available for a particular node 101*b-c* or whether the currently installed software is properly licensed. In one embodiment, the management agent 119 may obtain licensing information from the administrative system 103. The management agent 119 may also enable remote diagnosis and resolution of computing issues. One or more of the foregoing management tasks may be performed, for example, by LANDesk® Security Suite, LANDesk® Patch Manager, LANDesk® Management Suite, LANDesk® Instant Support Suite Pro, LANDesk® Inventory Manager produced by LANDesk Software, Inc., of South Jordan, Utah. The management agent 119, working together with the management application 117, can significantly reduce the time and expense required to manage nodes 101 within a network group 111. However, because the administrative system 103 is unable to detect and manage all the nodes 101 within the network group 111 in an automated fashion, the full time- and cost-saving capabilities of the management application 117 and management agent 119 are not fully realized.

Figure 2:
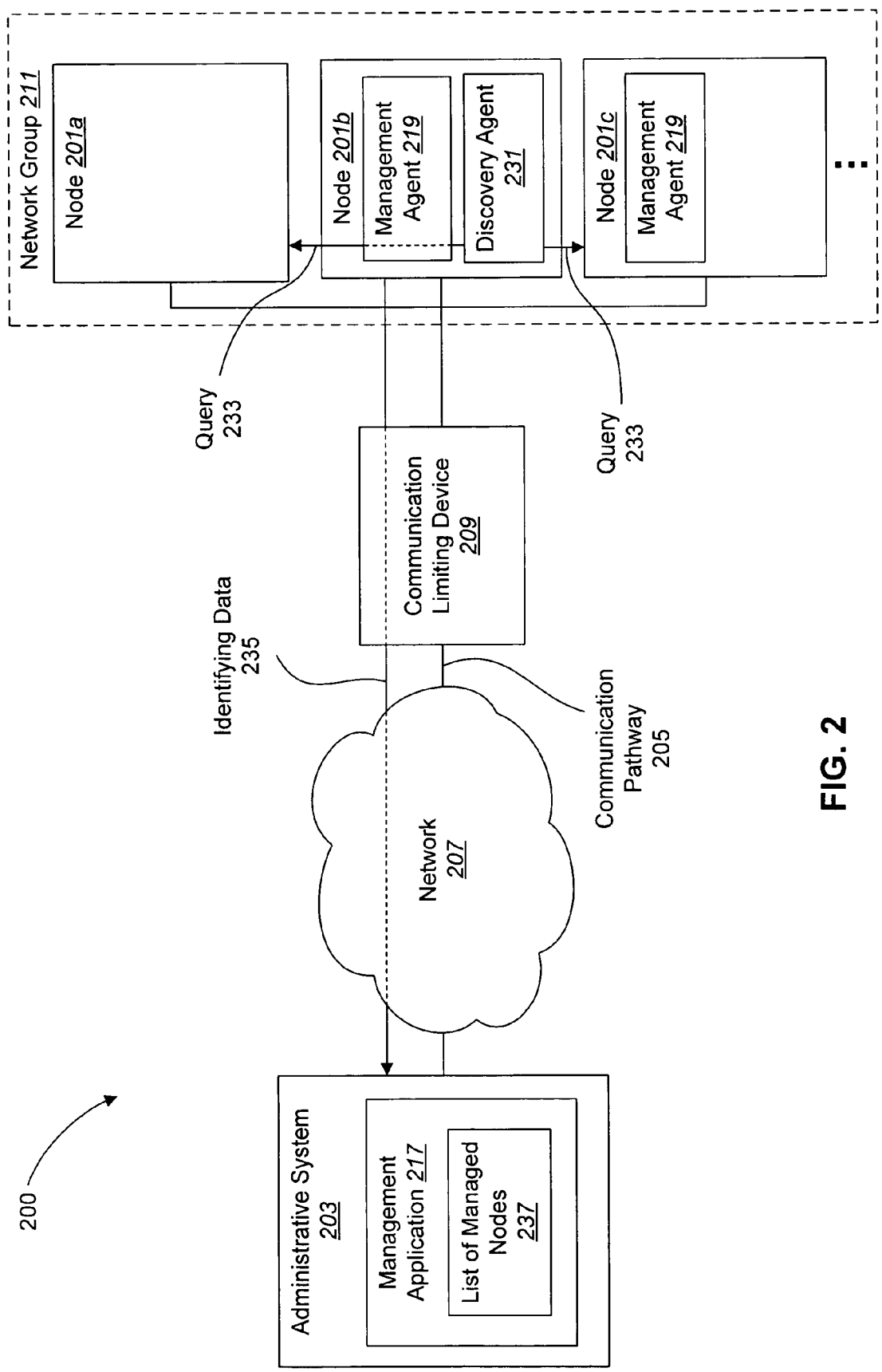
FIG. 2 is a block diagram illustrating one embodiment of a system for detecting and managing nodes within a network group.

FIG. 2 is a block diagram illustrating one embodiment of a system 200 for identifying and managing a previously undetected node 201*a*. As with the embodiment shown in FIG. 1, the embodiment of FIG. 2 includes an administrative computer system 203, a communication pathway 205 that may include a network 207, a communication limiting device 209, and a network group 211. In addition, certain nodes 201*b-c* within the network group are managed by the administrative system 203 using a management application 217 and a management agent 219 running on each node 201*b-c*. As before, a communication limiting device 209 prevents the administrative system 203 from detecting all the nodes 201 within the network group 211.

In the embodiment of FIG. 2, however, a discovery agent 231 has been installed and is running on the second node 201*b*. The discovery agent 231 includes one or more software packages that may be integrated with or separate and distinct from the management agent 219. As a result, the discovery agent 231 may be installed concurrently with the management agent 219 or may be installed at a different time. The discovery agent 231 may be installed remotely, for example, using the administrative system 203. Alternatively, the discovery agent 231 may be installed locally using a portable storage device (such as a CD-ROM) containing installation software for the discovery agent 231. The discovery agent 231 may be installed automatically, such as when the administrative system 203 determines that a discovery agent 231 has not yet been installed on a detected node 201, or manually, i.e., in response to user input received at a node 201 or the administrative system 203. In one embodiment, the discovery agent 231 is a small computer program such that it consumes only a small quantity or percentage of a node's 201 computing resources when running.

As indicated in FIG. 2, the communication limiting device 209 is not interposed between the second node 201b and other nodes 201a, 201c within the network group 211. The discovery agent 231 can thus detect the presence of other nodes 201a, 201c within the network group 211. The discovery agent 231 may do so using a number of different techniques. For example, the discovery agent 231 may transmit a query 233 to other nodes 201a, 201c within the network group 211. The query 233 may include, for example, "pinging." Pinging, which is sometimes referred to as Packet INternet Groping, involves transmitting a packet to a particular network address, such as an IP (Internet Protocol) address, and awaiting a response to determine whether a node 201 is found at the "pinged" address. Within an IP network, by way of example, a discovery agent 231 may ping all IP addresses within a subnet mask range that encompasses the network group 211. The query 233 may also involve, again by way of example only, UDP (User Datagram Protocol) packets or directory services queries. Furthermore, the discovery agent 231 may query accessible DNS (Domain Name System), DHCP (Dynamic Host Configuration Protocol) or router tables to identify nodes 201 within the network group 211. In one embodiment, the discovery agent 231 waits a specified period of time from the transmission of the query or queries 233 to determine whether a response will be received.

Through one or more queries 233 and/or responses thereto, the discovery agent 231 compiles identifying data 235 that identifies nodes 201 within the network group 211. The identifying data 235 may comprise, for example, an IP address or a MAC (Media Access Control) address for nodes 201 within the network group 211. The identifying data 235 gathered is then transmitted to the administrative system 203 through the communication pathway 205.

In one configuration, the administrative system 203 then compares a list 237 of managed nodes 201b-c to the identifying data 235 to determine whether the discovery agent 231 identified any previously undetected nodes 201a.

The systems and methods disclosed herein enable detection and management of nodes 201 that could not have been detected directly by a remote administrative system 203. In one embodiment, the list 237 of managed nodes is available to one or more nodes 201 within the network group 211 and thus the comparison between the identifying data 235 and list 237 of nodes 201 may be performed by one or more nodes 201 within the network group 211.

Figure 3:
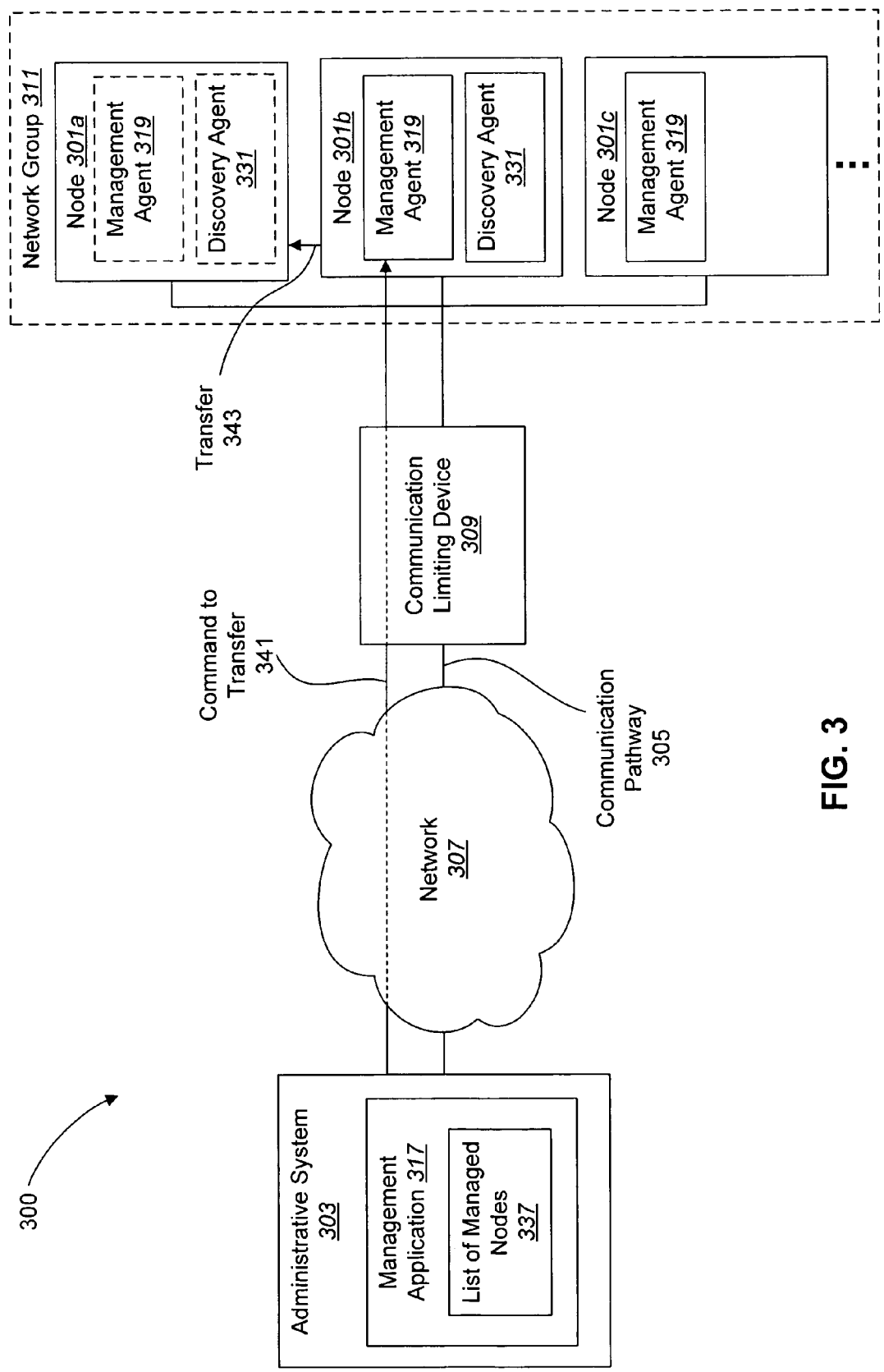
FIG. 3 is a block diagram illustrating one embodiment of a system for transferring management agent software to a newly discovered node.

FIG. 3 is a block diagram illustrating one embodiment of a system 300 for transferring a management agent 319 to a previously undetected node 301a. Like the embodiments shown in FIGS. 1 and 2, the embodiment of FIG. 3 includes an administrative system 303, electronic communication pathway 305 that may include a network 307, a communication limiting device 309 and a network group 311 having a plurality of nodes 301. Following identification of the first node 301a (as explained in connection with FIG. 2), the administrative system 303 may send a command 341 to transfer to the second node 301b. In response to receipt of the command 341, the second node 301b then transfers 343 an installable management agent 319 to the first node 301a. Thereafter, the management agent 319 is installed on the first node 301a. A wide variety of different systems and methods may be used to effectuate this installation process. For example, technology like NTRPC may be used to push the management agent 319 to previously undetected nodes 301a. Microsoft's Win32 API includes functions such as CopyFile and OpenSCManager that allow file copying and service operations to be performed remotely. Alternatively, a domain login script could be configured to install the management agent 319 during the login process. As indicated above, the management agent 319 enables the administrative computer system 303 to communicate with and manage the first node 301a notwithstanding the presence of the communication limiting device 309.

In one embodiment, an installable version of the discovery agent 331 is transferred to another node 301, such as the first node 301a, to enable identification of nodes 301 that are detectable from the transferee node 301.

Figure 4:
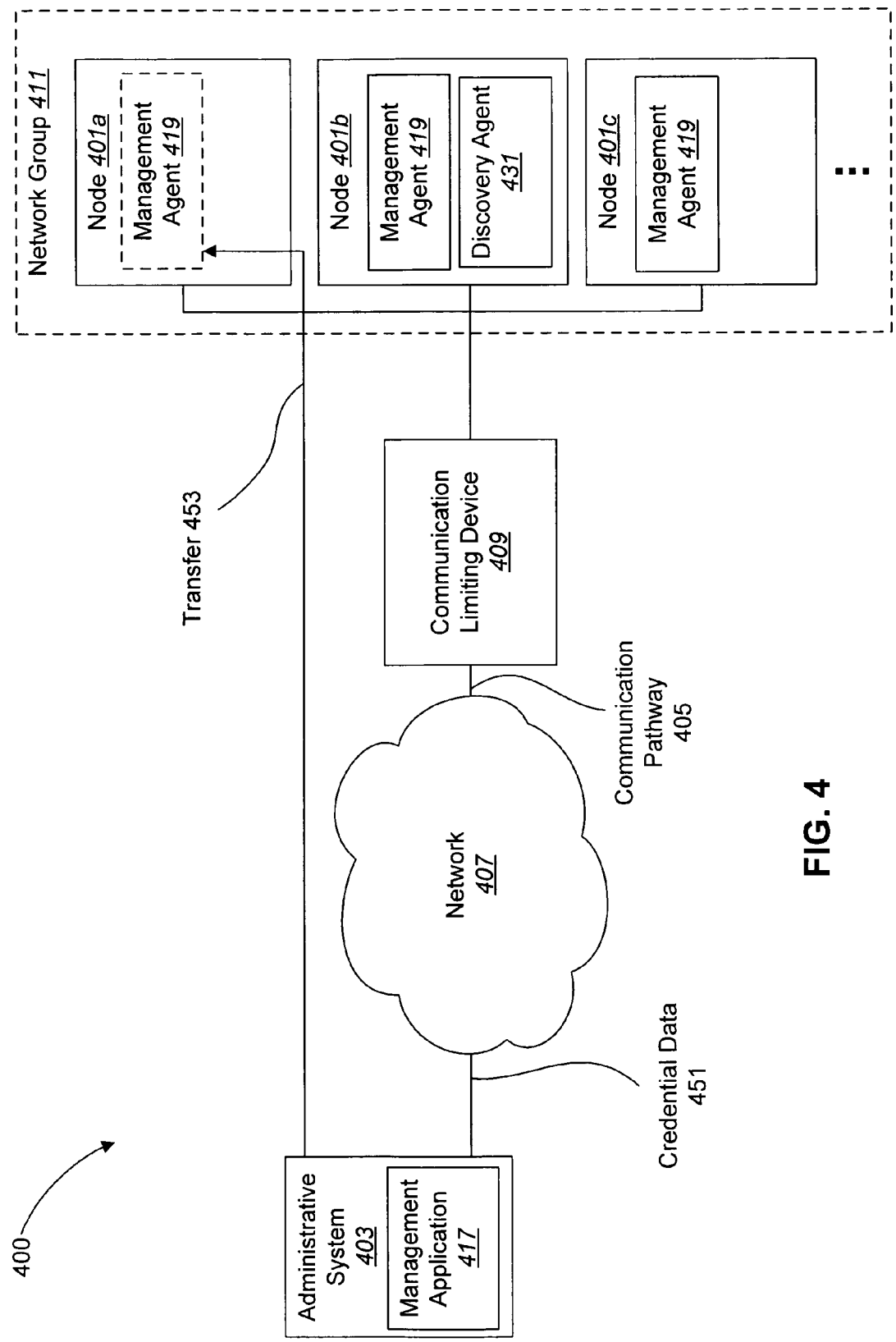
FIG. 4 is a block diagram illustrating another embodiment of a system for transferring management agent software to a newly discovered node.

FIG. 4 is a block diagram illustrating another embodiment of a system 400 for transferring a management agent 419 to a previously undetected node 401a. Like the embodiment shown in FIG. 3, the embodiment of FIG. 4 includes an administrative system 403, an electronic communication pathway 405 including a network 407, a communication limiting device 409 and a network group 411 having a plurality of nodes 401. In this embodiment, following detection of nodes 401 within the network group 411, the discovery agent 431 may gather and transmit credential data 451 to the administrative system 403. The credential data 451 enables the administrative system 403 to establish a network connection with previously undetected nodes 401, such as the first node 401a. In one embodiment, the credential data 451, for example, enables the administrative system 403 to establish a virtual private network (VPN) connection with the previously undetected node 401a or to control or manage one of the nodes using, for example, MICROSOFT® WINDOWS NETMEETING software. As a result, the management application 417 of administrative system 403 may directly transfer 453 an installable discovery agent 431 to the first node 401a. Of course, the systems and methods of transferring the management agent 419 depicted in FIGS. 3 and 4 are not exhaustive. A wide variety of different transfer techniques may be used to install the management agent 419 on a previously undetected node 401a.

The systems and methods disclosed herein significantly enhance the management capabilities of a node management system 400. Undetected nodes 401a can create serious security risks within a network group 411, potentially enabling damaging viruses to attack the network group 411. Remote detection of these nodes 401a enables security holes to be patched quickly. Furthermore, the disclosed systems and methods significantly decrease management costs of a network group 411, enabling automatic detection of previously unknown nodes 401a.

Figure 5:
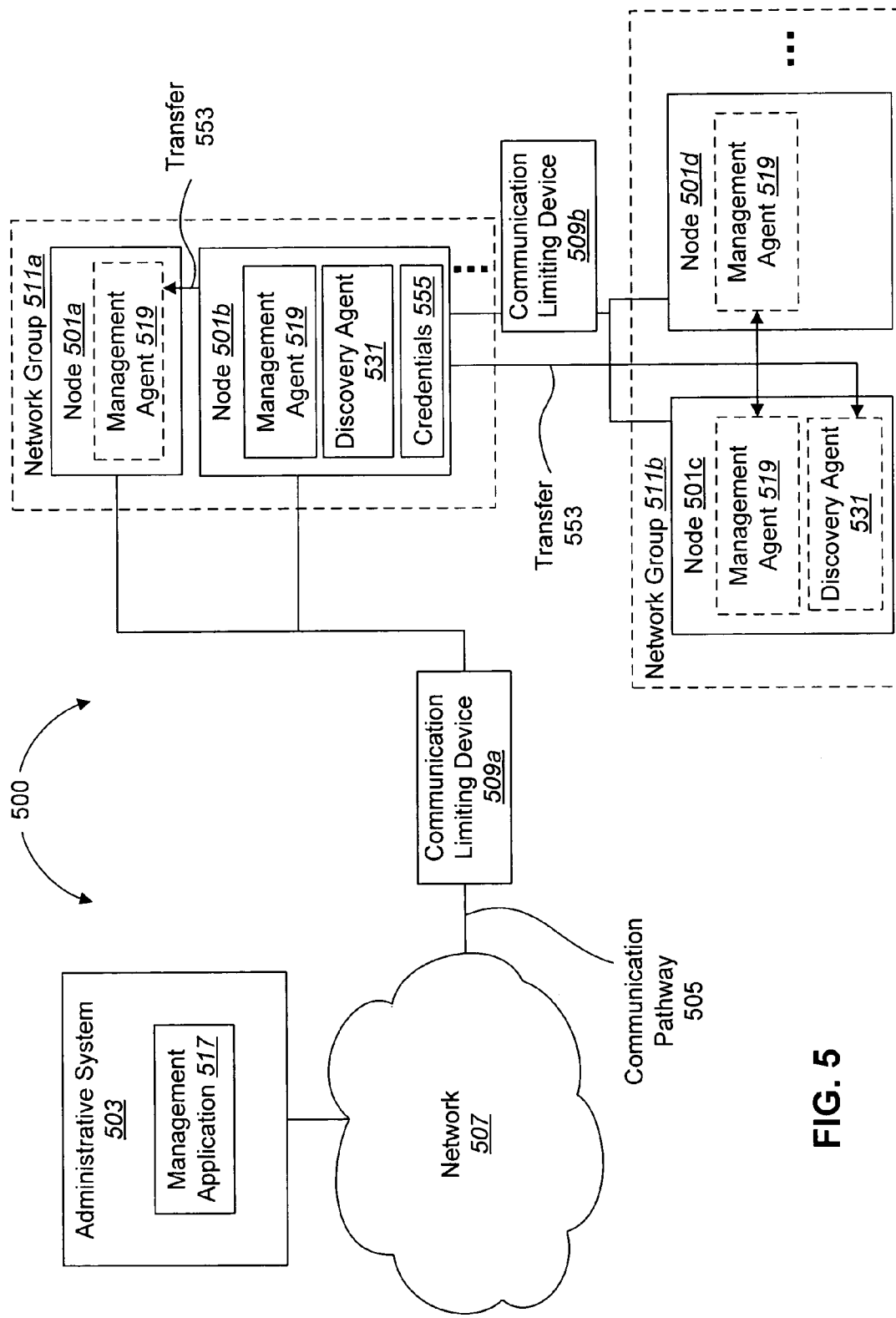
FIG. 5 is a block diagram illustrating one embodiment of a system for detecting and managing nodes.

FIG. 5 depicts an alternative embodiment of a system 500 for identifying and managing previously undetected nodes 501a. The depicted embodiment includes an administrative system 503, an electronic communication pathway 505 including a network 507, a first and a second communication limiting device 509a-b, and a first and a second network group 511a-b. With respect to the first network group 511a, the second node 501b is running a management agent 519 and a discovery agent 531. A previously undetected node 501a, the first node 501a, has been identified by the second node 501b. The management agent 519 is transferred 553 to and installed on the first node 501a, as similarly illustrated in FIGS. 3 and 4. As a result, the first node 501a may be managed by the management application 517 of the administrative system 503.

The second network group 511b is coupled to the second node 501b. As illustrated, the second network group 511b is shielded from the administrative system 503 by both the first and a second communication limiting devices 509a-b, thus making detection of these nodes 501 even less likely.

The second node 501*b* may be coupled to the second network group 511*b* in a number of different ways. For example, a router or a communication limiting device 509*b* is interposed between the second node 501*b* and the second network group 511*b*. In an alternative embodiment (not illustrated), the second node 501*b* simply has two network cards, a first card connected to the first network group 511*a* and a second card connected to the second network group 511*b*. In either case, it is unlikely that the administrative system 503 will be able to directly detect nodes 501*c-d* in the second network group 511*b*.

The second node 501*b*, in the present illustration, is capable of detecting the presence of the nodes 501*c-d* within the second network group 511*b*. This may be attributable to a number of different factors. For example, as illustrated, the second node 501*b* has credentials 555 to access the second network group 511*b* through the second communication limiting device 509*b*. In an alternative embodiment, there is no communication limiting device 509*b* interposed between the second node 501*b* and a second network group 511*b*, allowing the second node 501*b* to freely detect these nodes 501*c-d*. In yet another alternative embodiment, the second node 501*b* may have access to, for example, DNS, DHCP, or router tables enabling it to detect nodes 501*c-d* within the second network group 511*b*.

Following detection of the nodes 501*c-d* within the second network group 511*b*, the management agent 519 is transferred 553 to and installed on those nodes 501. Furthermore, the discovery agent 531 may be transferred 553 to one or more nodes 501*c-d* within the second group 511*b*, potentially enabling detection of additional undetected nodes 501*a*.

Figure 6:
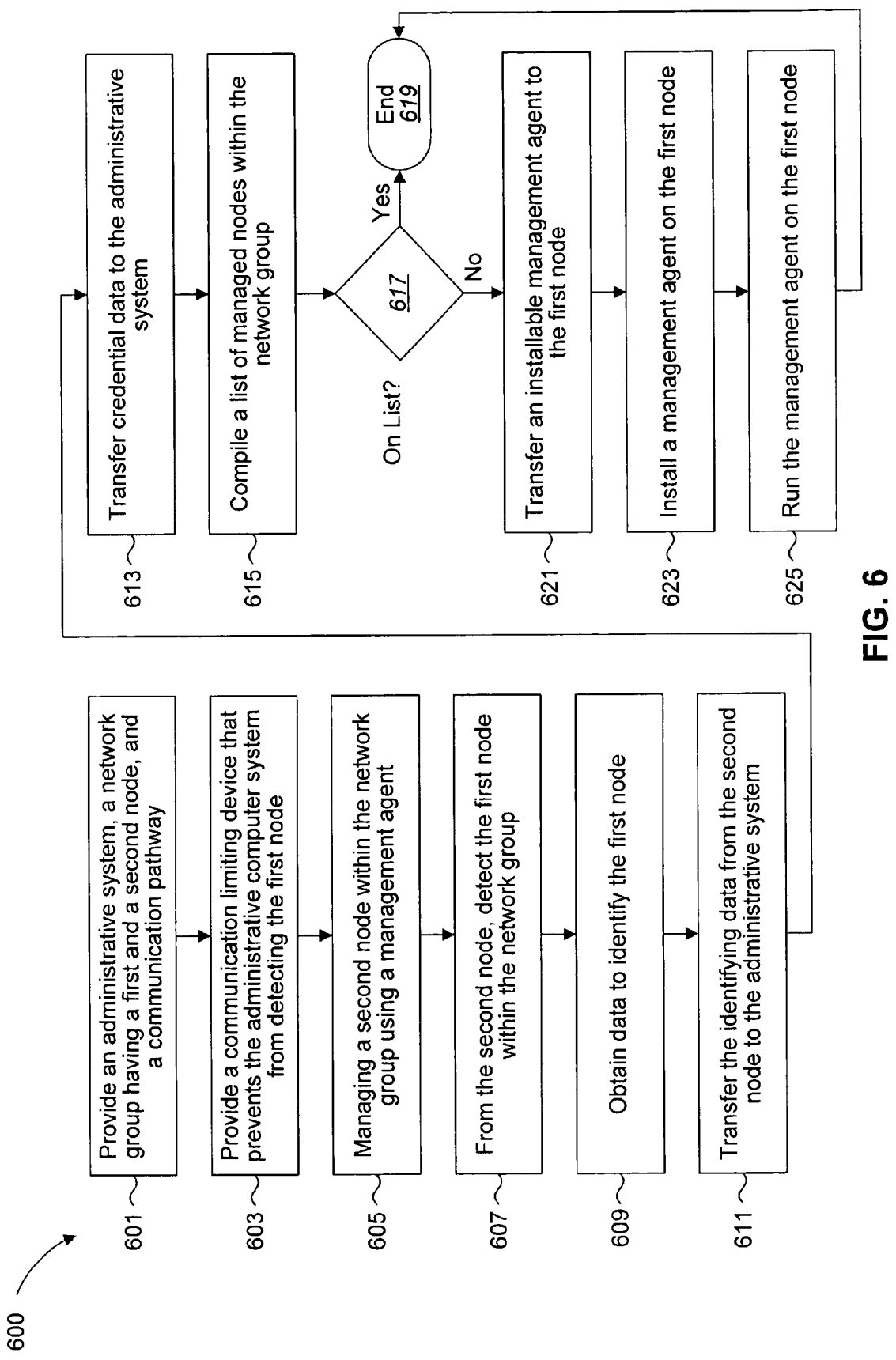
FIG. 6 is a flow diagram illustrating one embodiment of a method for detecting and managing nodes.

With reference to FIG. 6, a flow diagram illustrating a method 600 for identifying and managing previously undetected nodes 501*a* is disclosed. First, there is provided 601 an administrative system 503, an electronic communication pathway 505, and a network group 511. A communication limiting device 509 is further provided 603. The communication limiting device 509 prevents the administrative system 503 from detecting a first node 501*a* within the network group.

The second node 501*b* is managed using a management agent 519. The management agent enables the administrative system to communicate with and manage 605 the second node through the communication limiting device. As indicated above, the management agent enables management of the node 501*b*, such as operating system (OS) migration of the node or other management tasks.

A discovery agent 531 is also running on the second node 501*b*. The discovery agent 531 may be integrated with or separate from the management agent 519.

Using the discovery agent 531 running on the second node 501*b*, the first node 501*a* within the network group 511 is detected 607, using, for example, TCP/IP pinging. Identifying data (such as an IP address or MAC address) for the discovered nodes is then obtained 609 and transferred 611 to the administrative system 503.

In one embodiment, credential data 451 is transferred 613 to the administrative system from, for example, the second node. The credential data 451 enables the administrative system 503 to establish a network connection with nodes 501 within a network group 511, such as the first node.

A list 337 of managed nodes is compiled 615 by the administrative system 503 or, alternatively, by one of the nodes 501. The list may be compiled before, during, and/or after the node detection process performed by the second node 501*b*.

The list 337 is then compared to the identifying data 235 to determine 617 whether the first node is on the list. If the node is on the list, no further action is taken 619.

If the first node is not on the list, an installable management agent 519 is transferred 621 to the first node to enable installation of this software on the first node. In one embodiment, this transfer 621 may be made from the second node. Alternatively, the transfer 621 may be made directly from the administrative node to the first node, using, for example, credentials received at the administrative system. The management agent is installed 623 on the first node using the installable management agent. Thereafter, the management against is loaded into memory and runs 625 on the first node to enable management of the first node by the administrative system. The method is then terminated 619.

Of course, the method 600 described herein may be repeatedly or periodically executed to determine whether additional previously undetected nodes are now accessible. This method 600 may be further used to detect the presence of multiple previously undetected nodes.

Figure 7:
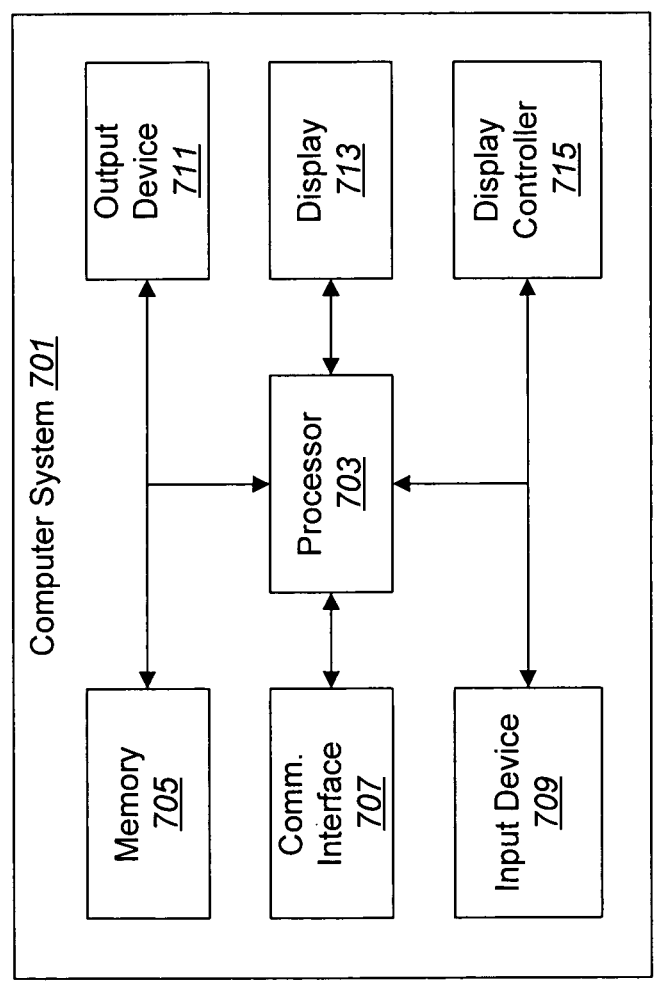
FIG. 7 is a block diagram illustrating major hardware components typically utilized in a computer or computing device.

FIG. 7 is a block diagram illustrating the major hardware components typically utilized in a computer system 701, or node 701. The illustrated components may be located within the same physical structure or in separate housings or structures.

The computer system 701 includes a processor 703 and memory 705. The processor 703 controls the operation of the computer system 701 and may be embodied as a microprocessor, a microcontroller, a digital signal processor (DSP) or other device known in the art. The processor 703 typically performs logical and arithmetic operations based on program instructions stored within the memory 705.

As used herein, the term memory 705 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 705 typically stores program instructions and other types of data. The program instructions may be executed by the processor 703 to implement some or all of the methods disclosed herein.

The computer system 701 typically also includes one or more communication interfaces 707 for communicating with other electronic devices. The communication interfaces 707 may be based on wired communication technology, wireless communication technology, or both. Examples of different types of communication interfaces 707 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 701 typically also includes one or more input devices 709 and one or more output devices 711. Examples of different kinds of input devices 709 include a keyboard, mouse, microphone, remote control device, button, joystick, trackball, touchpad, lightpen, etc. Examples of different kinds of output devices 711 include a speaker, printer, etc. One specific type of output device which is typically included in a computer system is a display device 713. Display devices 713 used with embodiments disclosed herein may utilize any suitable image projection technology, such as a cathode ray tube (CRT), liquid crystal display (LCD), light-emitting diode (LED), gas plasma, electroluminescence, or the like. A display controller 715 may also be provided, for converting data stored in the memory 705 into text, graphics, and/or moving images (as appropriate) shown on the display device 713.

Of course, FIG. 7 illustrates only one possible configuration of a computer system 701. Various other architectures and components may be utilized.

Figure 8:
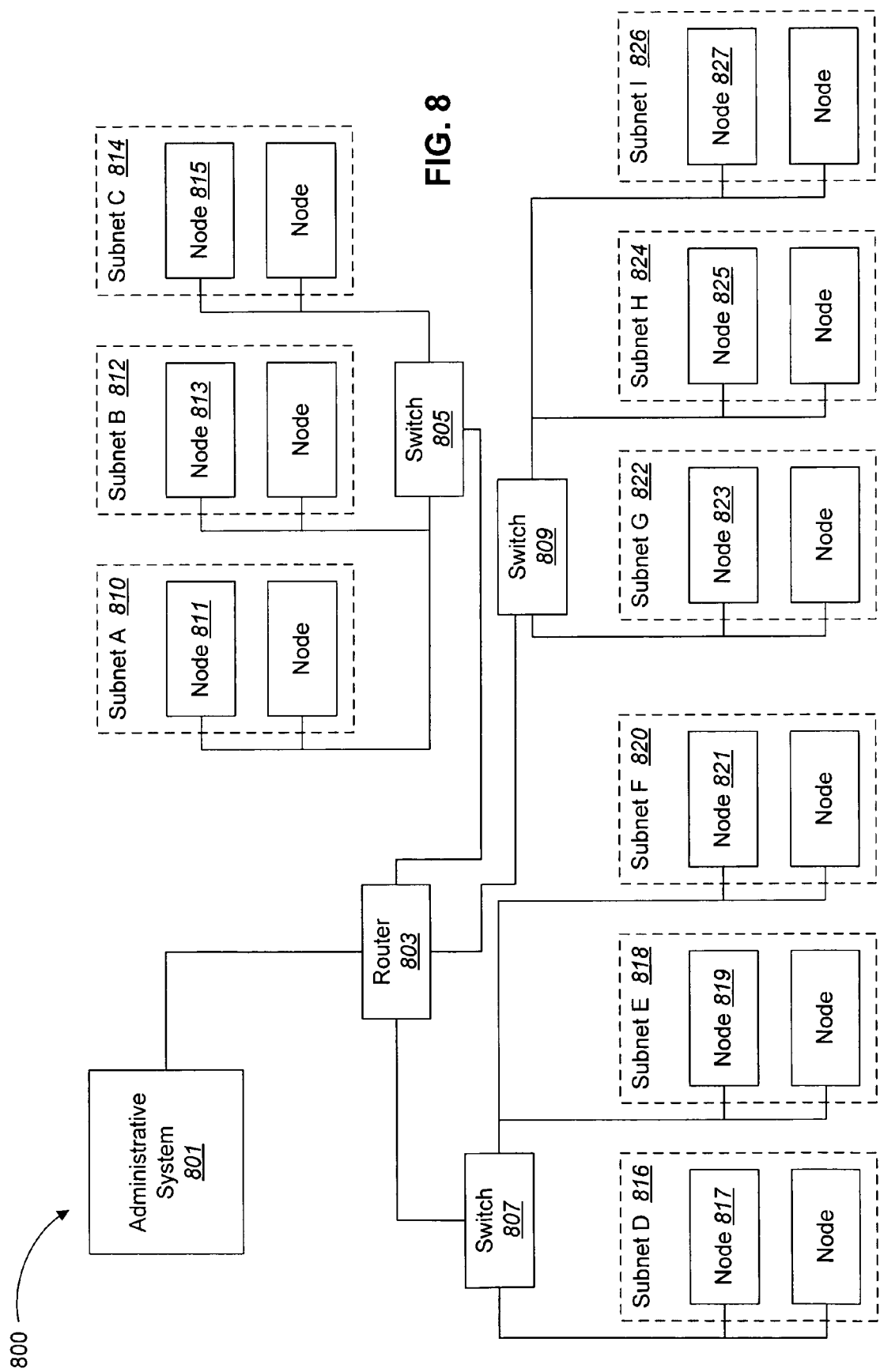
FIG. 8 is an exemplary block diagram illustrating a computer network on which the present systems and methods may be implemented.

FIG. 8 is an exemplary block diagram illustrating a computer network 800 on which the present systems and methods may be implemented. In FIG. 8, an administrative system 801 connects to a router 803. The administrative system 801, or administrative node 801, may be any computer or computing device that has been configured to, or is being used for, receiving notifications from one or more monitors.

The router 803 may be connected to three switches: a first switch 805, a second switch 807 and a third switch 809. Each switch 805, 807, 809 connects to three subnets. The first switch 805 connects to three subnets 810, 812, and 814. The second switch 807 connects to three subnets 816, 818, and 820. The third switch 809 connects to three subnets 822, 824, and 826. The network groups 111, 211, 311, 411, 511 described above may be embodied in a wide variety of configurations and may include a local area network, a subnet 810, 812, and 814, or a group of subnets 810, 812, and 814. The network nodes or elements 811, 813, 815, 817, 819, 821, 823, 825 and 827 represent computer systems or devices on the computer network. One or more of the nodes may use embodiments of the systems and methods described herein. The network may include both wired and wireless connections to nodes or elements 811, 813, 815, 817, 819, 821, 823, 825 and 827 within the network 800.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present invention disclosed herein without departing from the spirit and scope of the invention.

What is claimed is:

1. A method of detecting and managing nodes within a network group, comprising:

providing an administrative computer system, a network group, and a communication pathway for electronic communication between the administrative computer system and the network group, wherein a communication limiting device in the communication pathway prevents the administrative computer system from detecting a first node within the network group;

managing a second node within the network group using a management agent to enable the administrative computer system to communicate with and manage the second node through the communication limiting device;

from the second node within the network group, detecting, by a discovery agent installed on the second node, the first node within the network group, wherein the discovery agent is separate and distinct from the management agent;

obtaining, at the second node, identifying data to identify the first node, wherein the identifying data comprises an address of the first node;

transferring the address of the first node to the administrative computer system;

transferring an installable management agent from the second node to the first node;

transferring the discovery agent to the first node, wherein the discovery agent is transferred after the transfer of the installable management agent to the first node, and wherein the discovery agent on the first node is executable to detect additional nodes, wherein the identifying data is obtained at the second node before the installable management agent and the discovery agent are transferred to the first node, wherein the address of the first node is obtained by the second node and transferred from the second node to the administrative computer system before the discovery agent is transferred to the first node;

installing and maintaining the installable management agent on the first node to enable the administrative computer system to communicate with and manage the first node through the communication limiting device; and maintaining the discovery agent on the first node to detect additional nodes.

2. The method of claim 1, further comprising:

compiling a list of nodes within the network group that are managed by the administrative computer system; and based on the identifying data, determining whether the first node is included in the list of nodes, wherein transferring the installable management agent to the first node is based on whether the first node is included in the list of nodes.

3. The method of claim 1, wherein transferring the installable management agent to the first node comprises transferring the installable management agent from the second node to the first node.

4. The method of claim 3, wherein a domain login script on the second node is configured to transfer the installable management agent to the first node.

5. The method of claim 1, further comprising transferring credential data to the administrative system to enable the administrative system to communicate with the first node.

6. The method of claim 5, wherein transferring the installable management agent to the first node comprises transferring the installable management agent from the administrative system to the first node.

7. The method of claim 6, wherein the credential data allows the administrative system to establish a virtual private network connection with the first node.

8. The method of claim 1, wherein at least one of the first and second nodes are end-user nodes.

9. The method of claim 1, wherein the administrative computer system sends a command to the second node to transfer the installable management agent to the first node, wherein the installable management agent is not transferred to the first node until the command from the administrative computer system is received.

10. The method of claim 1, wherein obtaining identifying data to identify the first node comprises querying, by the discovery agent, at least one of User Datagram Protocol (UDP) packets, directory services, a Domain Name System (DNS) table, a Dynamic Host Configuration Protocol (DHCP) table, and a router table.

11. A system for detecting and managing nodes within a network group, comprising:

a first and a second node within a network group, the first and second nodes being in electronic communication with each other;

an administrative computer system;

a communication pathway for electronic communication between the network group and the administrative computer system;

a communication limiting device in the communication pathway that prevents the administrative computer system from detecting the first node within the network group, wherein the second node and administrative system include a computer-readable storage medium comprising instructions for detecting and managing nodes within the network group, the instructions being executable to:

manage the second node within the network group using a management agent to enable the administrative system to communicate with and manage the second node through the communication limiting device;

from the second node within the network group, detect, by a discovery agent installed on the second node, the first node within the network group, wherein the discovery agent is separate and distinct from the management agent;

obtain, at the second node, identifying data to identify the first node, wherein the identifying data comprises an address of the first node;

transfer the address of the first node to the administrative computer system;

transfer an installable management agent from the second node to the first node;

transfer the discovery agent to the first node, wherein the discovery agent is transferred after the transfer of the management agent to the first node, and wherein the discovery agent on the first node is executable to detect additional nodes, wherein the identifying data is obtained at the second node before the management agent and the discovery agent are transferred to the first node, wherein the address of the first node is obtained by the second node and transferred from the second node to the administrative computer system before the discovery agent is transferred to the first node;

install and maintain the installable management agent on the first node to enable the administrative computer system to communicate with and manage the first node through the communication limiting device; and maintain the discovery agent on the first node to detect additional nodes.

12. The system of claim 11, wherein the instructions are further executable to:

compile a list of nodes within the network group that are managed by the administrative computer system; and based on the identifying data, determine whether the first node is included in the list of nodes, wherein transferring the installable management agent to the first node is based on whether the first node is included in the list of nodes.

13. The system of claim 11, wherein the instructions to transfer the installable management agent to the first node comprise instructions to transfer the installable management agent from the second node to the first node.

14. The system of claim 11, wherein at least one of the first and second nodes are end-user nodes.

15. A non-transitory computer-readable storage medium comprising executable instructions for detecting and managing nodes within a network group, the instructions being executable to:

provide an administrative computer system, a network group, and a communication pathway for electronic communication between the administrative computer system and the network group, wherein a communication limiting device in the communication pathway prevents the administrative computer system from detecting a first node within the network group;

manage a second node within the network group using a management agent to enable the administrative system to communicate with and manage the second node through the communication limiting device;

from the second node within the network group, detect, by a discovery agent installed on the second node, the first node within the network group, wherein the discovery agent is separate and distinct from the management agent;

obtain, at the second node, identifying data to identify the first node, wherein the identifying data comprises an address of the first node;

transfer the address of the first node to the administrative computer system;

transfer an installable management agent from the second node to the first node;

transfer the discovery agent to the first node, wherein the discovery agent is transferred after the transfer of the installable management agent to the first node, and wherein the discovery agent on the first node is executable to detect additional nodes, wherein the identifying data is obtained at the second node before the management agent and the discovery agent are transferred to the first node, wherein the address of the first node is obtained by the second node and transferred from the second node to the administrative computer system before the discovery agent is transferred to the first node;

install and maintain the installable management agent on the first node to enable the administrative computer system to communicate with and manage the first node through the communication limiting device; and maintain the discovery agent on the first node to detect additional nodes.

16. The non-transitory computer-readable storage medium of claim 15, wherein the instructions are further executable to:

compile a list of nodes within the network group that are managed by the administrative computer system; and based on the identifying data, determine whether the first node is included in the list of nodes, wherein transferring the installable management agent to the first node is based on whether the first node is included in the list of nodes.

17. The non-transitory computer-readable storage medium of claim 15, wherein at least one of the first and second nodes are end-user nodes.

* * * * *